(12) United States Patent
Wirtz

(10) Patent No.: US 6,895,644 B2
(45) Date of Patent: May 24, 2005

(54) BATTERY GRIDS

(75) Inventor: John O. Wirtz, Fort Gratiot, MI (US)

(73) Assignee: Wirtz Manufacturing Co., Inc., Port Huron, MI (US)

( * ) Notice: Subject to any disclaimer, the term of this patent is extended or adjusted under 35 U.S.C. 154(b) by 192 days.

(21) Appl. No.: 10/109,224

(22) Filed: Mar. 28, 2002

(65) Prior Publication Data

US 2002/0182487 A1 Dec. 5, 2002

Related U.S. Application Data

(63) Continuation-in-part of application No. 09/364,639, filed on Jul. 30, 1999, now abandoned.

(51) Int. Cl.[7] .......................... B23P 13/00; H01M 4/56; H01M 4/72; H01M 4/74
(52) U.S. Cl. .............................. 29/2; 429/225; 429/233; 429/242
(58) Field of Search .................................. 429/241, 242, 429/233, 225, 228; 29/2

(56) References Cited

U.S. PATENT DOCUMENTS

| 3,947,936 A | * | 4/1976 | Wheadon .......................... 29/2 |
| 3,953,244 A | * | 4/1976 | Prengaman ..................... 148/2 |
| 4,358,518 A | * | 11/1982 | Matter ......................... 429/245 |
| 4,415,016 A | | 11/1983 | McLane et al. |
| 4,509,381 A | | 4/1985 | Ikemoto et al. |
| 4,534,404 A | | 8/1985 | McLane et al. |
| 4,543,863 A | | 10/1985 | Rader |
| 4,544,014 A | | 10/1985 | McLane et al. |
| 4,583,437 A | | 4/1986 | Rader et al. |
| 4,606,383 A | | 8/1986 | Yanik |
| 4,658,623 A | * | 4/1987 | Blanyer et al. ................ 72/268 |
| 4,973,218 A | | 11/1990 | Wirtz et al. |
| 5,611,128 A | * | 3/1997 | Wirtz .............................. 29/2 |

* cited by examiner

Primary Examiner—Patrick Ryan
Assistant Examiner—Thomas H. Parsons
(74) Attorney, Agent, or Firm—Reising, Ethington, Barnes, Kisselle, P.C.

(57) ABSTRACT

A battery positive grid is continuously cast of lead and thereafter cold worked to reduce its cross sectional thickness to change the microstructure of the lead and provide enhanced corrosion resistance and other properties needed for positive grids. The as cast thickness is reduced by not more than ½ or 2 to 1, to produce a positive grid with a lead weight of 0.5 to 2.1 grams per square inch of the area of the plan of the cold worked grid which improves the life of a battery in which it is used. A battery negative grid is continuously cast of lead and thereafter cold worked to reduce its cross sectional thickness 1.2:1 to less then 1.5:1 to increase the ultimate tensile strength needed for a lighter negative grid with a lead weight of 0.3 to 0.9 of a gram per square inch of the area of its plan.

40 Claims, 4 Drawing Sheets

BATTERY GRIDS

REFERENCE TO COPENDING APPLICATION

This application is a continuation-in-part of U.S. patent application Ser. No. 09/364,639, filed on Jul. 30, 1999, and now abandoned.

FIELD OF THE INVENTION

This invention relates to lead-acid batteries and more particularly to cast grids for these batteries and a method and apparatus of making continuously cast grids.

BACKGROUND OF THE INVENTION

In use, in lead-acid batteries, the lead grids of the positive plates are subject to far more corrosion and growth than are the grids of the negative plates. In use, the lead in the positive plates corrodes or erodes away and disappears which decreases and eventually ends the useful life or life cycle of the battery. In use, the lead grids of the positive plates also grow and expand or elongate, particularly in length and height, on the order of 5% to 15% of their original length and height. This tends to cause the positive grid plates to pierce their separators or envelopes and short or ground out with an adjacent negative plate. This growth also tends to limit the design or pattern of the wires of the positive grids because diagonal wires are longer and hence have a greater absolute increase in length and hence a greater tendency to pierce a separator and short out.

Typically, lead battery grids may be made by (1) continuous casting of a web having a plurality of interconnected grids which are subsequently separated, (2) book molding or casting an individual grid or a panel of two grids in a mold usually of cast iron or steel which is water cooled or (3) by an expanded metal process. It has been found that compared to book molded grids, when continuous cast grids are utilized in positive plates, they are subject to greater growth and significantly increased corrosion which results in a useful life in service of about one-half to two-thirds of book molded grids as determined by SAE J-240 life cycle tests. Consequently, for many lead-acid battery applications, such as automotive batteries, continuously cast grids are unsatisfactory for positive battery plates or electrodes. Nevertheless, primarily due to reduced manufacturing and assembly costs, continuously cast lead grids are utilized in the negative plates or electrodes of many automotive batteries.

Therefore, various processes and equipment have been developed and commercially utilized for making continuously cast negative grids and battery plates. Typically, a plurality of grids are cast as a continuous strip or web of lead which may be washed to remove molding compounds and lubricants and is usually coiled for inspection and storage before further processing. Subsequently, the web is uncoiled, passed through a continuous pasting machine, cut into individual pasted grids or plates which are passed through a drying oven to remove excess moisture from the paste, and then stacked in piles of individual plates by a stacker for subsequent processing and assembly as negative plates in lead acid batteries. Suitable continuous casting machines are disclosed in U.S. Pat. Nos. 4,509,381; 4,415,016; 4,534,404; and 4,544,014. A suitable paster is disclosed in U.S. Pat. No. 4,606,383, suitable cutting devices are disclosed in U.S. Pat. Nos. 4,543,863 and 4,583,437, and a suitable stacker is disclosed in U.S. Pat. No. 4,973,218.

U.S. Pat. No. 5,611,128 discloses a method and apparatus for improving the performance of continuously cast battery positive grids by reducing the thickness of the grids by about 4 to 1. The reduction in thickness provides increased tensile strength and resistance to corrosion to extend the life of a battery containing these grids, and provides a lighter battery grid comparable to gravity cast grids which require less material to form and assemble and thereby reduces the cost to form a battery containing the grids. While generally satisfactory and a significant improvement over previous continuously cast battery positive grids, the grids formed according to the present invention require a very thick as cast thickness and when made thinner by mechanical reduction, the wires become undesirably wide. Also, the grids so formed, while lighter than previous continuously cast positive grids, remain relatively heavy and therefore costly to produce. Still further, while the strength and corrosion resistance of grids formed according to the method of this patent may be increased, the large reduction tends to cause more distortion in diagonal grid designs.

SUMMARY OF THE INVENTION

A battery positive grid is continuously cast of lead and cold worked to reduce its cross sectional thickness and elongate it to change the microstructure of the lead and provide enhanced corrosion resistance, tensile strength after age hardening and other properties needed for positive grids. The as cast thickness of the positive grids is reduced by not more than 2.0:1, and preferably in the range of about 1.5:1 to 2:1 to a thickness not greater than 0.035 of an inch and preferably in the range of 0.015 to 0.035 of an inch and a weight of lead in the range of 0.5 to 2.1 grams per square inch of the area of the plan or layout of the cold worked grid, to produce an improved positive grid which improves the life of a battery in which it is used. A battery negative grid is continuously cast of lead and thereafter cold worked to reduce its cross sectional thickness and elongate it to increase the ultimate tensile strength needed for a lighter negative grid. The as cast thickness of the negative grids is reduced in the range of about 1.2:1 to less than 1.5:1 with a thickness in the range of less than 0.022 to 0.010 of an inch and a weight of lead in the range of 0.3 to 0.9 of a gram per square inch of the area of the plan or layout of the cold worked negative grid, to produce the desired properties for negative grids after age hardening.

Typically, the lead weight of these positive grids is 40% to 45% less than comparable positive grids of U.S. Pat. No. 5,611,128 produced by the method and apparatus thereof. Typically, the lead weight of these negative grids is 10% to 15% less than comparable negative grids of U.S. Pat. No. 5,611,128 produced by the method and apparatus thereof.

Preferably, the positive and negative grids are made by continuous casting an elongate web of a plurality of grid blanks, preferably washing the web to remove molding compounds, and then passing the web through the nip of one or more pairs of compression rollers to reduce the thickness of the web. The thickness of the web is usually reduced within 24 hours, desirably within 12 hours, preferably within 4 hours and more preferably right after being continuously cast and washed or cleaned. This reduction in thickness also significantly increases the length of the web and grid wires extending parallel to the direction of travel of the web through the rollers and substantially increases the width of the grid wires extending transversely to the direction of travel of the web through the rollers. After the reduction is completed, the web is pasted, preferably cut into wet pasted grids or plates, dried to remove moisture and at least begin curing the paste, preferably at an elevated temperature in a drying oven, and usually stacked in piles for subsequent assembly as positive and negative plates or electrodes of a lead acid battery.

Objects, features and advantages of this invention are to provide continuously cast battery positive grids which have greatly improved corrosion resistance and significantly reduced growth in use, and to provide continuously cast positive and negative grids which have a longer in service useful life, fewer short outs and premature failures, require significantly less lead, can be readily produced with a wide variety of wire configurations, have improved tolerances and dimensional control, are produced with less scrap, improved quality, and at higher production rates, can be easily produced by automated manufacturing processes and equipment, and are stable, rugged, durable, reliable and of relatively simple design, economical manufacture and assembly.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENTS

Figure 1:
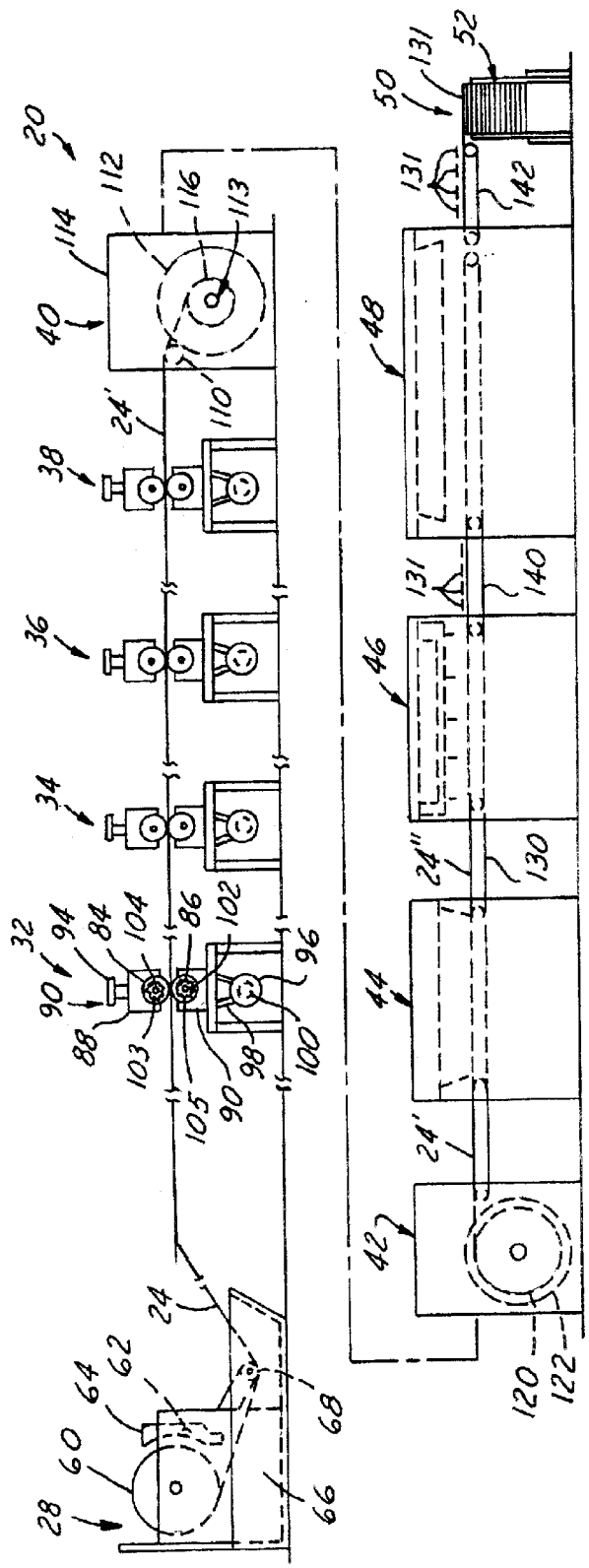
FIG. 1 is a side view of a production line for making positive or negative grids and plates of this invention by the method of this invention.
Figure 3:
FIG. 3 is a sectional view taken generally on line 3—3 of FIG. 2 and illustrating the cross sectional configuration of a grid wire and a frame wire extending transversely of the web.
Figure 4:
FIG. 4 is a fragmentary sectional view of a positive grid wire and frame wire extending longitudinally of the web.

Referring in more detail to the drawings, FIG. 1 illustrates a production line 20 for utilizing the method of this invention to make battery positive grids 22 (FIG. 5) and negative grids 23 (FIG. 7), and battery plates or electrodes of this invention. In the production line, a web 24 of a plurality of interconnected successive grid blanks is continuously cast from a molten lead composition by a continuous casting machine 28. The moving web 24 is reduced in cross section and elongated in the direction of travel by a series of compression roller machines 32, 34, 36 & 38 and wound on a drum or reel in a coiling machine 40 for inspection, handling and any storage before further processing. The web is unwound from the reel in an uncoiling machine 42, passes through a continuous pasting machine 44, which applies battery paste to the web and a cutting machine 46 which cuts individual pasted grids or plates from the web. The individual pasted plates pass in succession through a drying oven 48 which removes moisture from the paste and through a stacking machine 50 which deposits the individual plates in piles or stacks 52 which are removed for any further processing and assembly into a lead-acid battery as plates or electrodes of the battery.

Casting Machine

The casting machine 28 casts the web 24 of lead with a plurality of successive grid blanks in a continuous manner. In the machine 28, molten lead is supplied to a mold cavity in a rotating cylindrical drum 60 under superatmospheric pressure through an orifice slot 62 in a shoe 64 with an arcuate segment bearing on the peripheral surface of the drum. A grid pattern is machined in the peripheral surface of the drum 60 to form a mold cavity in which the lead rapidly solidifies as it is advanced beyond the orifice slot 62 which opens onto the drum. The solidified web 24 is stripped from the rotating drum and preferably passed through a water bath 66 to rapidly quench and cool it and under a guide roller 68. Typically, the web is continuously cast at a rate of about 50 to 200 lineal feet per minute. Suitable continuous casting machines are disclosed in U.S. Pat. Nos. 4,415,016; 4,509,581; 4,534,404 and 4,544,014, the disclosures of which are incorporated herein by reference and hence will not be described in further detail.

Roller Stands

In accordance with the method of this invention, the cross sectional thickness of the web 24 is reduced and the web is elongated in its direction of travel in each of the succeeding roller stands 32, 34, 36 and 38. Since each of the roller stands has essentially the same construction and arrangement, only the first roller stand 32 will be described in detail.

As shown in FIG. 1, each stand has a pair of compression rollers 84 and 86 each journalled for rotation in bearings received in axially spaced apart pairs of carrier blocks 88 and 90. To drive the web through the nip of the rollers, the lower roller 86 is driven by an electric motor 96 through a timing belt 98 and complementary cog pulleys mounted on the motor drive shaft 100 and the shaft 102 of the roller 86. The upper roller 84 is driven by a gear 103 mounted on its roller shaft 104 which meshes with a complimentary gear 105 mounted on the lower roller shaft 102. Preferably, the motor 96 is a variable speed electric motor to facilitate driving the rollers 84 and 86 at the proper peripheral surface speed to feed the web 24 through the nip of the compression rollers. This surface speed differs for each stand 32–38 because each time the web is reduced in thickness, it is elongated in the direction of travel of the web thereby requiring that the rollers in each succeeding stand be driven at a higher peripheral surface speed. In each stand, the rollers 84 and 86 are driven at a constant peripheral surface speed substantially equal to the speed of the web as it enters the stand.

Coiler

As shown in FIG. 1, after the moving web emerges from the last roller stand 38, it enters a coiler machine 40. The reduced web 24' passes over a guide roller 110 and is wound in a coil on a reel 112 received on a pair of arbors 113 carried by a pair of upright end plates 114 fixed to the face of the coiler machine. The reel 112 is rotated by a variable speed electric motor (not shown) at a rotary speed which decreases as the diameter of the coil 116 increases to take up the reduced web 24' at the rate it emerges from the last roller stand 38.

Uncoiler

The uncoiling machine 42 has essentially the same construction as the coiler 40 with a coil 120 of a reduced web 24' wound on a reel 122 which is received on arbors in the unwinder. To feed the web 24' to the paster 44, the reel 122 is rotated to unwind the coil 120 by a variable speed motor (not shown). To supply the web 24' to the paster 44 at a substantially constant lineal surface speed, the motor increases the speed at which the reel is rotated as the coil 120 unwinds and hence its diameter decreases.

Typically, a web coiler 40 and uncoiler 42 are used in the production line so that the casting, washing and rolling steps can be carried out independently of the pasting, cutting, drying and stacking steps. This provides greater flexibility in production operations and readily accommodates the differential between the lineal speed at which the reduced web 24' emerges from the last roller stand 38 (100 to 250 lineal feet per minute) relative to the much slower speed at which it is supplied to the pasting machine (typically 50–200 lineal feet per minute). This also permits inspection, storage, and, if desired, age hardening of the reduced web 24' before it is further processed. This also permits either portion of the line to be repaired or serviced while the other portion is in production and either portion to be idle when it is not needed for production.

Pasting Machine

An electro-chemically active paste is applied to the reduced web 24' as it passes through the pasting machine 44. All of the interstices or open spaces between the wires of the web are filled with the paste, and preferably the web is "over pasted" so that the wires are completely embedded in and surrounded by the paste and the paste extends outwardly from both the top and bottom faces of the web and has a thickness greater than the thickness of the web. Typically, the paster applies a strip of paper to both the top and bottom exposed faces of the paste which prevents the paste from sticking to the equipment and facilitates downstream handling and processing of the pasted web 24". A suitable machine for continuously pasting the web is disclosed in U.S. Pat. No. 4,606,383, the disclosure of which is incorporated herein by reference and hence the paster 44 will not be described in greater detail.

Cutting Machine

The pasted web 24" is advanced by a powered belt conveyor 130 into the cutting machine 46 which cuts or severs the pasted web 24" into individual pasted plates 131. The cutter has appropriate synchronizing circuitry so that the web is cut through the center of a double width transversely extending frame wire to produce, as shown FIG. 5, the trailing frame wire 132 of the grid 22 of one pasted plate and the leading frame wire 134 of the grid 22 of the immediately succeeding pasted grid.

A suitable machine for cutting a continuous web into successive individual battery plates and suitable synchronizing circuitry are disclosed in U.S. Pat. Nos. 4,583,437 and 4,543,863, the disclosures of which are incorporated herein by reference and hence will not be described in greater detail.

Drying Oven

The individual pasted plates 131 are received on a belt conveyor 140 which moves them through the flash drying oven 48. Preferably, to provide a gap or space between succeeding adjacent plates 131 to thereby decrease the risk of collision and damage of the plates, the conveyor 140 is driven at a greater lineal speed than the lineal speed of the individual plates 131 emerging from the cutting machine 46.

To facilitate further handling and processing of the pasted plates, preferably, oven 48 merely dries or removes moisture from the outer layer or skin of the faces of the paste which temporarily strengthens and solidifies the skins while the central portion of the paste remains relatively soft and pliable and retains substantial moisture. For many processing applications, this flash drying is not absolutely necessary and hence for such applications, this oven is optional. Typically, this is a direct flame gas fired convection oven which may be of conventional construction and hence will not be described in further detail.

Stacker

The individual plates emerging from the oven 48 are advanced by an entry conveyor 142 into the stacker mechanism 50. In the stacker, a stream of successive individual pasted plates 131 moving at a high rate of speed are continuously piled in stacks 52 each having a plurality of superimposed plates. The stacks of plates are removed and subsequently assembled as plates or electrodes in lead-acid batteries. A suitable battery plate stacker is disclosed in U.S. Pat. No. 4,973,218, the disclosure of which is incorporated herein by reference and hence the stacker 50 will not be described in greater detail.

Positive Grids

In accordance with this invention, the desired properties of continuously cast positive grids are achieved when the thickness of the as cast web 24 is reduced by between 1.5:1 to 2:1. To achieve the most satisfactory results for a wide range of applications, the final thickness of continuously cast positive grids after reduction is not greater than 0.035 of an inch and desirably between about 0.015 to 0.030 of an inch with a lead weight in the range of about 0.5 to 2.1 grams per square inch of the overall plan or layout of the cold worked grid. Preferably, within the prescribed ranges, as the cold working reduction ratio is increased, the final thickness may be decreased to reduce the lead weight of the finished cold worked positive grid. A significant savings of both lead and paste is realized by using the thinner positive grids. To avoid roller slipping, preferably the maximum reduction in thickness is not greater than about 25% to 35% for each pass through one pair of rollers. Therefore, to achieve an overall reduction ratio of about 2 to 1, it is preferable to reduce the as cast web in at least two passes and preferably through three or four successive pairs of rollers. For example, if a continuous cast web as cast has a thickness of 0.050 of an inch and is reduced 2 to 1 to a final thickness of 0.025 of an inch, the first, second and third reductions can be 0.007 of an inch each and the fourth reduction 0.004 of an inch. These four reductions can be accomplished by passing the web through the successive roller stands 32, 34, 36 & 38 to reduce the web thickness respectively to 0.043, 0.036, 0.029 and 0.025 of an inch.

With each reduction in thickness, the length of the web increases in the direction of rolling or longitudinally of the web. With a reduction in thickness of 2 to 1, the overall length of the web increases about 1.20:1 to 1.30:1 in the direction of rolling. Rolling to reduce the thickness of the web has little affect on its transverse width which usually increases less than 1%. Aging of as cast webs before rolling has an affect on the ratio and particularly the uniformity of the increase in length of the webs when they are being rolled to reduce their thickness. The increase in length is larger and significantly more variable if as cast webs are aged for more than 36 hours before rolling. Normally, an as cast web should be rolled to reduce its thickness within 24 hours after continuous casting, desirably within 4 hours after continuous casting, preferably within 30 minutes after continuous casting, and most preferably within 15 minutes after continuous casting.

All reductions in thickness of the web should be carried out under cold working conditions with the peak metal temperature being in the range of 35° F. to 180° F., and preferably 50° F. to 90° F. Suitable rollers for reducing the web thickness may have a diameter of at least 2.5 inches and be made of hardened and ground tool steel with a surface finish of about 15–20 micro inches and a peripheral surface hardness of about 64–65 Rockwell on the C Scale.

The continuously cast and rolled positive grids may be made from a lead alloy containing about 0.03% to 0.12% calcium and about 0% to 2.5% tin. As continuously cast, and before any reduction in thickness, webs and grids of this lead alloy have a small and large random and non-uniform grain microstructure, a tensile strength of about 6,000 to 6,500 psi after age hardening for 30 days at room temperature, and relatively poor corrosion resistance and significant growth in use as grids of positive plates in a lead acid battery. In contrast, continuously cast webs and grids which were reduced in thickness by between 1.5:1 and 2.0:1 by cold working utilizing the process of this invention have a microstructure with smaller and more uniform grains which appear to be oriented and aligned generally parallel to the direction of deformation and travel of the web during rolling. These webs and grids of this alloy as produced by this process have greatly increased tensile strength of at least 9,000 psi and usually about 10,000 to 11,000 psi after full age hardening (for 30 days at room temperature) and greatly improved corrosion resistance and reduced growth in use as grids of positive plates in a lead-acid battery. Webs and grids of this lead alloy as produced by this process also have maximum rupture strength after full age hardening at room temperature which is dramatically greater than the rupture strength of webs and grids of this alloy as continuously cast and aged for at least 30 days at room temperature.

Figure 2:
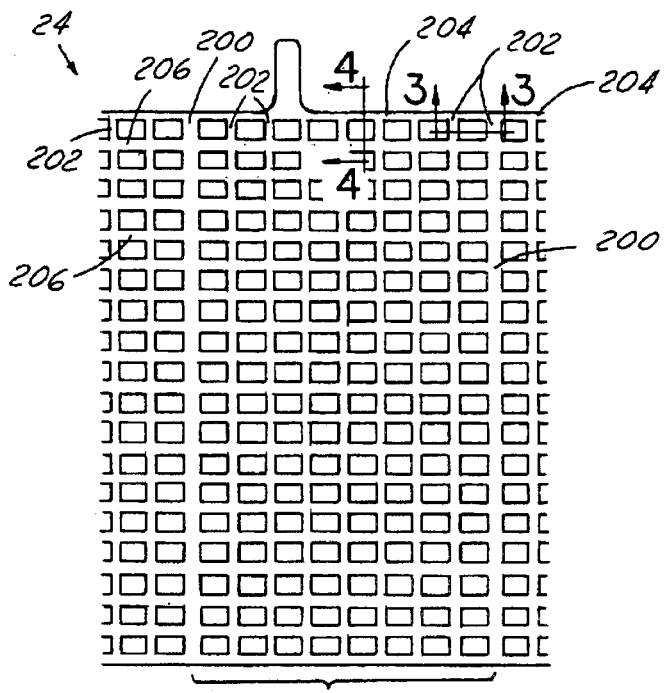
FIG. 2 is a fragmentary plan view of a web of positive grid blanks as continuously cast by the production line.
Figure 5:
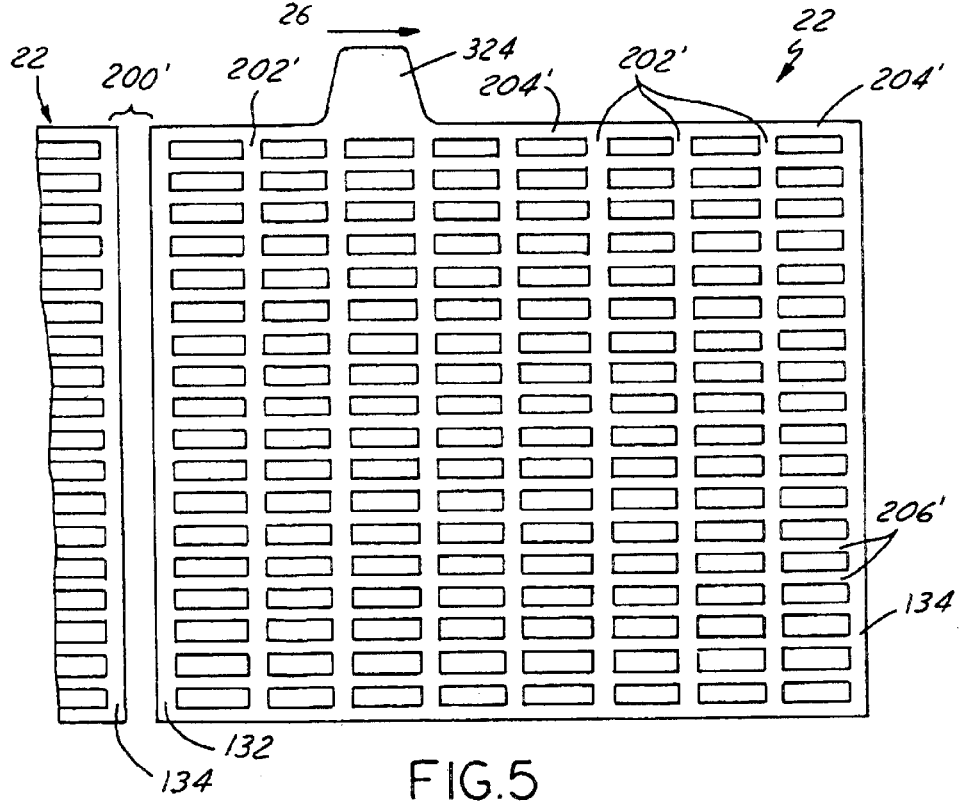
FIG. 5 is a plan view of a positive grid after its grid blank has been reduced in thickness and extended in the longitudinal direction of the web by rolling and after being cut from the web and for purposes of illustration shown without any paste applied thereto.

As may be seen by a comparison of FIGS. 2 & 5, when an as continuous cast grid blank 26 of a web 24 of this lead alloy with a thickness of 0.050 of an inch was reduced in thickness 2:1 to 0.025 of an inch in accordance with this process, it was elongated 1.2:1 in the longitudinal direction of rolling with virtually no change in overall width. In cross-section the average width of the transverse frame wire 200, 200' and transverse internal wires 202, 202' increased about 1.24:1 and the cross-sectional area was essentially unchanged. In cross-section the average width of the longitudinal frame wire 204, 204' and internal longitudinal wires 206, 206' increased about 1.1:1 with a reduction in cross-sectional area about 0.9:1.

The final cold worked positive grids produced by this method with a substantially rectangular perimeter overall plan or layout (as shown in FIG. 5) with a longitudinal length in the direction of rolling of 5.55 inches and a transverse width or height of 4.95 inches typically have the following lead weights:

| Cold Worked Reduction Ratio | Final Thickness (Inches) | Weight (grams) | Weight to Plan Area (grams/square inch) |
| --- | --- | --- | --- |
| 1.5:1 | 0.015 | 15.2 | 0.55 |
| 2.0:1 | 0.015 | 17.5 | 0.64 |
| 1.5:1 | 0.035 | 41.2 | 1.50 |
| 2.0:1 | 0.035 | 54.3 | 1.98 |

Thus, each positive grid produced by this method has a lead weight in the range of about 0.5 to 2.1 grams per square inch of the area of the plan or layout of the positive grid. In general, increasing the positive grid final thickness increases its corrosion resistance and lead weight and for the same final thickness increasing the reduction ratio increases corrosion resistance and lead weight.

Thus, for a given or required corrosion resistance a preferred combination of the reduction ratio and thickness to produce a positive grid with a minimum lead weight can be empirically determined by testing after age hardening the corrosion resistance of sample grids with various reduction ratios and thicknesses and the same plan area and grid wire layout.

Negative Grids

The production of continuously cast negative grids according to this invention is achieved utilizing essentially the same process as described for making positive grids with the exception of the differences described below. The desired properties of continuously cast negative grids are achieved when the thickness of the as cast web 24 is reduced at least about 17% or about 1.2:1 to 33% or less than 1.5:1. The primary benefit of the cold worked reduction of thickness of the as cast web for use in negative battery plates is to achieve a stronger cold worked grid with a higher tensile strength permitting a thinner, and hence, a lighter weight negative grid while still maintaining sufficient strength and stiffness to permit subsequent handling, pasting, processing and assembly into lead-acid batteries utilizing commercially available equipment to do so. The final thickness of continuously cast negative grids after reduction is not greater than 0.022 of an inch, desirably not greater than 0.020 of an inch, and in many applications preferably about 0.015 to 0.010 of an inch. A significant savings of both lead and paste is realized by using the significantly thinner negative grids.

For the negative grids the maximum reduction in thickness through any pair of rollers preferably is not greater than about 35%. Therefore, to achieve an overall reduction ratio of about 1.5:1 or about 33%, it is preferable to reduce the as cast web in at least two passes or possibly through three successive pairs of rollers, although achieving the total reduction is possible in one rolling station. For example, if a continuous web as cast has a thickness of 0.030 of an inch and is reduced 1.5:1 to a final thickness of 0.020 of an inch, the first reduction is preferably about 0.007 of an inch, the second reduction is about 0.003 of an inch, for a desired total reduction of 0.010 of an inch resulting in the final thickness of 0.020 of an inch.

As with the positive grid process, the length of the web increases in the direction of rolling of the web for each reduction in thickness. For the negative grids with a reduction of about 1.5:1, the length of the web increases about 1.15 to 1 in the direction of rolling. Hence, the length and thickness of the as cast negative grid blanks of a web will be different than that of the as cast positive grid blanks of a web such that the post process negative grids will have substantially the same overall length and width as the post process positive grids.

Aging of the as cast web before rolling has an effect on the ratio and particularly the uniformity of the increase in length of the web. Hence, it is desirable that the negative as cast web be rolled to reduce its thickness within 24 hours after continuous casting and most preferably within 15 minutes after continuous casting. The temperature range for the cold working process for the negative web should also be in the same range as for the positive web and preferably about 50 degrees F. to 90 degrees F.

Since negative plates in a lead-acid battery are exposed to minimal corrosion, enhancing the corrosion characteristics of the negative grids is unnecessary and essentially irrelevant. Changing the alloy microstructure is therefore not necessary. Also, as the microstructure of the lead alloy changes during the cold working process, the density of the lead material starts to increase and beyond a reduction ratio of 3.5:1 the ultimate tensile strength decreases. An increase in material density is highly undesirable for the negative grids because the primary benefit of reducing the thickness of the as cast web is to increase the tensile strength of the material permitting a thinner and hence a lighter negative battery grid.

A cold worked as cast web having a 1.5:1 reduced thickness provides a negative grid of equivalent strength, stiffness and durability and about 10% to 25% lighter, and also thinner than a negative grid that is simply continuous cast and age hardened for at least 30 days. By cold working the as cast negative web, the tensile strength improvement provides a thinner and lighter negative grid to produce a negative battery plate which is less expensive than simply a continuous cast negative grid and hence a cost savings in grid lead and possibly battery paste.

The continuously cast and rolled negative grids may be made from a lead alloy similar to the material used to produce the positive grids according to this invention. For the negative grids however, the process yields an ultimate tensile strength of at least 8,000 psi and usually about 10,250 to 10,600 psi after full age hardening at room temperature. Webs and grids of this lead alloy as produced by this process for negative grids also have maximum rupture strength after full age hardening at room temperature. This is dramatically greater than the rupture strength of webs and grids of this alloy merely continuously cast and aged for 30 days at room temperature.

Figure 6:
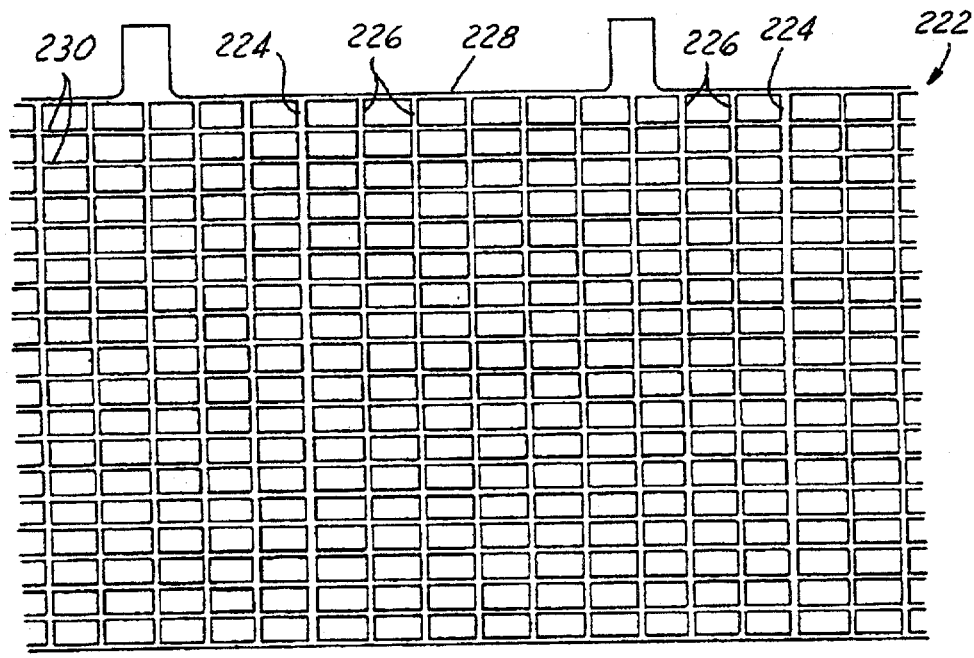
FIG. 6 is a fragmentary plan view of a web of negative grid blanks as continuously cast by the production line.
Figure 7:
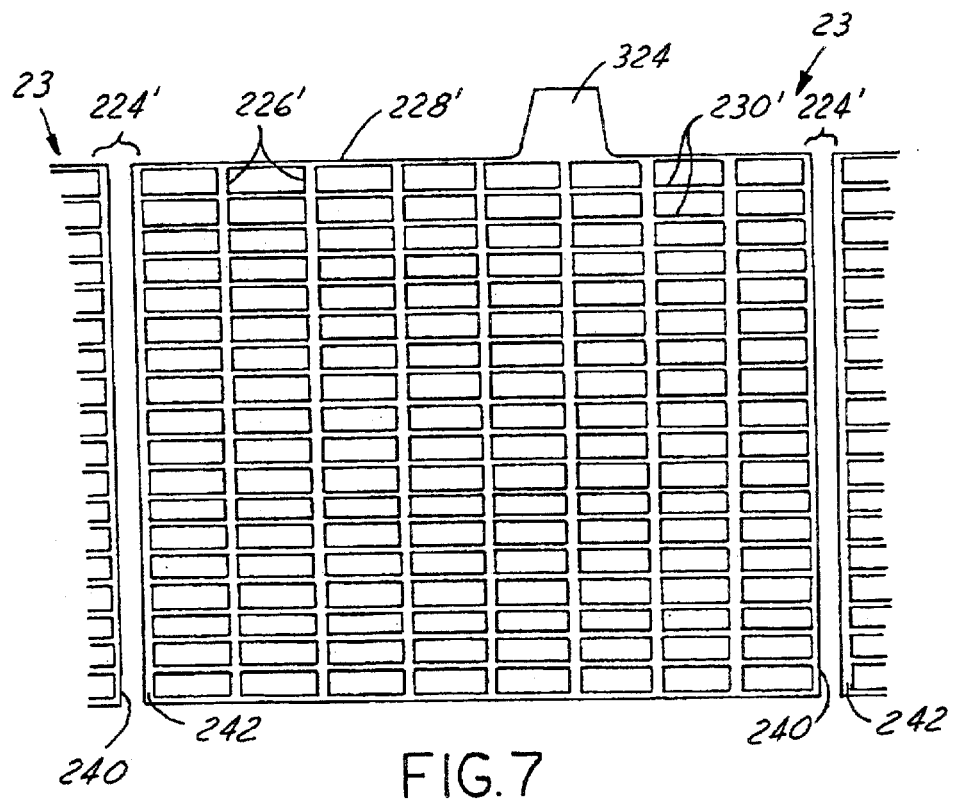
FIG. 7 is a plan view of a negative grid after its grid blank has been reduced in thickness and extended in the longitudinal direction of the web by rolling and after being cut from the web and for purposes of illustration shown without any paste applied thereto.

As may be seen by a comparison of FIGS. 6 & 7, when an as continuous cast negative grid blank 23 of a web 222 of this lead alloy with a thickness of 0.0375 of an inch was reduced 1.5:1 to about 0.025 of an inch in accordance with this process, the web was elongated 1.2:1 in the longitudinal direction of rolling with virtually no change in overall width. In cross-section the average width of the transverse frame wire 224, 224' (which when severed defines the leading edge 240 of one grid 23 and the trailing edge 242 of the adjacent grid 23) and transverse internal wires 226, 226' increased about 1.2:1 and the cross-sectional area increased about 1.2:1. In cross-section the average width of the longitudinal frame wire 228, 228' and internal longitudinal wires 230, 230' increased about 1.55:1 and in cross-sectional area about 0.9:1.

The final cold worked negative grids produced by this method with a substantially rectangular perimeter overall plan or layout (as shown in FIG. 7) with a longitudinal length in the direction of rolling of 5.55 inches and a transverse width or height of 4.95 inches typically have the following lead weights:

| Cold Worked Reduction Ratio | Final Thickness (Inches) | Weight (grams) | Weight to Plan Area (grams/square inch) |
| --- | --- | --- | --- |
| 1.2:1 | 0.010 | 9.6 | 0.35 |
| 1.48:1 | 0.010 | 10.3 | 0.38 |
| 1.2:1 | 0.022 | 21.6 | 0.79 |
| 1.48:1 | 0.022 | 23.2 | 0.84 |

Thus, each negative grid produced by this method has a lead weight in the range of about 0.3 to 0.9 of a gram per square inch of the area of the plan or layout of the negative grid. In general, increasing the negative grid final thickness increases its strength, stiffness, durability and lead weight and for the same final thickness increasing the reduction ratio increases its strength, stiffness, durability and lead weight. Thus, for a given or required negative grid strength, stiffness and durability, a preferred combination of its reduction ratio and final thickness to produce a negative grid with a minimum lead weight can be empirically determined by testing after age hardening the strength, stiffness and durability of sample grids with various combinations of reduction ratios and thicknesses and the same plan and grid wire layout.

Lead-Acid Battery

Figure 8:
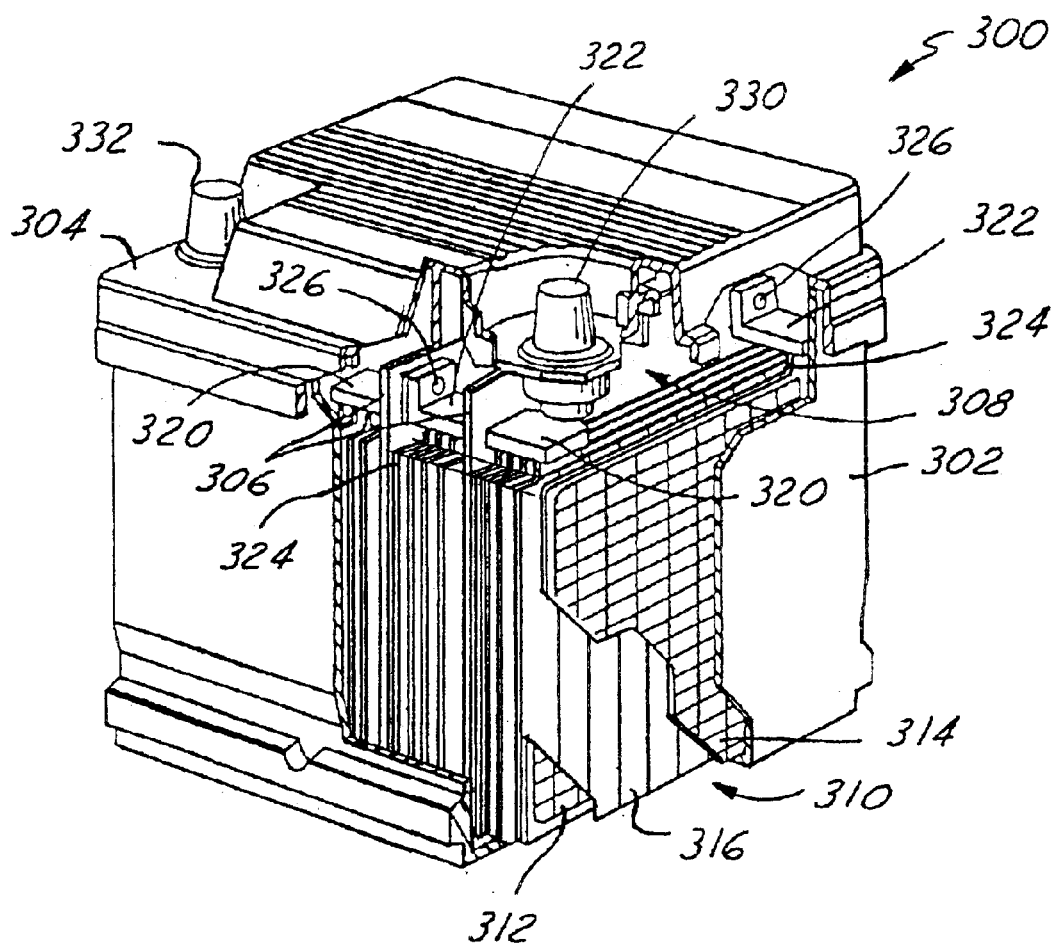
FIG. 8 is a fragmentary sectional view of a lead-acid battery assembled with grids of this invention made by the method of this invention.

A lead-acid battery 300 embodying the grids and plates of this invention is shown in FIG. 8. The battery 300 has an outer rectangular case 302 and a top cover 304 constructed from a material such as polypropylene. Within the case are a number of integrally molded battery cell dividers 306 defining a number of separate battery cell wells 308. The outer case construction herein described is merely for illustrative purposes and may take on a number of configurations and constructions without departing from the scope and spirit of the invention.

A battery cell 310 is disposed within each of the wells 308 between the cell dividers 306 within the case 302. A battery cell 310 has a set of positive plates 312 constructed as previously described and a set of negative plates 314 also constructed as previously described. The battery plates 312, 314 of the cell are assembled in a plate book positioned in an alternating sequence of positive and negative plates. A separator 316 constructed from a microporous electrically insulating material is disposed between each positive and negative plate for preventing plates of different polarity from touching, thereby preventing a short circuit within any particular cell 310 of the battery 300. The separator 316 sometimes takes the form of an envelope, as shown, into which each positive plate 312 or negative plate 314 is placed.

As shown in FIG. 8, a pair of lead plate straps 320, 322 each electrically connect the plates of like polarity within a book by connecting the tabs 324 (see FIGS. 5 & 7) formed on the top portion of each plate. Hence, each cell 310 has a positive strap 320 and a negative strap 322 disposed on top of the plate book. To connect the individual cells together in series an intercell connector 326 made of lead is disposed between each cell 310 for connecting the positive plate straps 320 and negative plate straps 322 of adjoining cells in series. The positive strap 320 of the first cell is connected to a positive lead battery post 330 and the negative strap 322 of the last cell is connected to negative lead battery post 332, respectively, forming the positive and negative lead-acid battery terminals. A dilute sulfuric acid solution fills a majority of the remaining space to the desired level within each well 308 and is the electrolyte necessary to produce the chemical reactions which take place within each battery cell 310.

A typical battery such as an automotive type battery has six of such cells each producing a potential of about two volts of electrical energy thereby forming a typical 12 volt battery as depicted in FIG. 8. A battery having plates constructed according to this invention is lighter in weight than prior art batteries and has improved battery life in that the positive plates have improved corrosion resistance. Further, the as cast thickness of the wires can be reduced compared to some prior art grids and after being cold-formed, the wires do not become undesirably wide.

A 12-volt automotive battery formed according to the present invention having a 45 Ah (ampere hour) rating at 400 CCA (cold cranking amperes) with 80 minutes of reserve capacity, and formed from positive grid plates of 0.06% Ca, 1.3% Sn alloy of lead with a thickness of about 0.032 inches after a reduction of not more than 2:1 according to the present invention had a significantly longer life in SAE J-240 life cycle tests as compared to other batteries with calcium alloy positive grids and the same negative grids and overall assembly and construction. Notably, the batteries according to the present invention completed 2,887 cycles while the best prior art battery tested survived only 1,576 cycles. Desirably, the batteries according to the present invention showed no growth or corrosion problems during the life cycle tests.

What is claimed is:

1. A method of making a positive grid for a positive plate of a lead-acid battery comprising, continuous casting molten lead into an elongate web having a plurality of successive grid blanks each having a substantially uniform thickness, a plurality of spaced apart and interconnected wires having interstices between them, and a lead weight in the range of 0.5 to 2.1 grams per square inch of the area of the overall plan of the grid after cold working, cold working the grid blanks of the continuous cast web to reduce the thickness of the cast web by not more than 2:1 and to a thickness of not more than 0.035 of an inch, and cutting positive grids from the cold worked web to provide positive grids having substantially increased corrosion resistance in use in positive plates in a lead-acid battery.

2. The method as defined in claim 1 wherein the cold worked and reduced thickness positive grid has a microstructure with a smaller average grain size and a more uniform grain structure than that of the as continuous cast web.

3. The method as defined in claim 1 wherein cold working the continuous cast web reduces the thickness of the cast web in the range of 1.5:1 to 2:1.

4. The method as defined in claim 3 wherein cold working the continuous cast web produces positive grids having a tensile strength of at least 9,000 psi after fully age hardening at room temperature.

5. The method as defined in claim 1 which also comprises cold working the continuous cast web to increase the longitudinal length of the cast web at least 1.2:1.

6. The method as defined in claim 1 which also comprises cold working the continuous cast web to increase the longitudinal length of the cast web in the range of about 1.2:1 to 1.3:1.

7. The method as defined in claim 1 wherein cold working the continuous cast web produces positive grids having a tensile strength of at least 9,000 psi after fully age hardening at room temperature.

8. The method as defined in claim 1 wherein the cold working of the continuous cast web occurs at a peak metal temperature in the range of about 35 degrees F. to 180 degrees F.

9. The method as defined in claim 1 wherein the cold working of the continuous cast web occurs at a peak metal temperature in the range of about 50 degrees F. to 90 degrees F.

10. The method as defined in claim 1 wherein cold working to reduce the thickness of the cast web by not more than 2:1 occurs within 24 hours of continuous casting of the web.

11. The method as defined in claim 1 wherein cold working to reduce the thickness of the cast web by not more than 2:1 occurs within 4 hours of continuous casting of the web.

12. The method as defined in claim 1 wherein cold working to reduce the thickness of the cast web occurs within ¼ hour of continuous casting of the web.

13. The method as defined in claim 1 which also comprises applying electro-chemically active paste to the web to at least substantially fill the interstices with the paste after the cold working of the web.

14. The method as defined in claim 1 which also comprises applying electro-chemically active paste to the web to at least substantially fill the interstices of the web with the paste after the cold working of the cast web, and cutting the positive grids from the pasted web to provide positive plates for lead-acid batteries.

15. The method as defined in claim 1 wherein cold working to reduce the thickness of the continuous cast web comprises passing the cast web through the nip of at least one pair of compression rollers to reduce the thickness of the web.

16. The method as defined in claim 1 wherein cold working to reduce the thickness of the continuous cast web comprises passing the web serratum through the nip of each of at least three pair of compression rollers to reduce the thickness of the web as it passes through the nip of each pair of rollers.

17. The method as defined in claim 16 wherein the cast web is reduced in thickness by not more than about 35% as the web passes through the nip of each pair of rollers.

18. The method as defined in claim 1 wherein the cold worked and reduced thickness positive grid has a thickness of not greater than about 0.035 of an inch.

19. The method as defined in claim 1 wherein the cold worked and reduced thickness positive grid has a thickness of not greater than about 0.032 of an inch.

20. A method of making a negative grid for a negative plate of a lead-acid battery comprising, continuous casting molten lead into an elongate web having a plurality of successive grid blanks each having a substantially uniform thickness, a plurality of spaced apart and interconnected wires having interstices between them, and a lead weight in the range of 0.3 to 0.9 of a gram per square inch of the area of the overall plan of the grid after cold working, cold working the grid blanks of the continuous cast web to reduce the thickness of the cast web in the range of less than 1.5:1 to 1.2:1 and to a thickness in the range of 0.022 to 0.010 of an inch, and cutting negative grids from the cold worked web.

21. A method of making positive grids and negative grids for positive plates and negative plates of a lead-acid battery comprising, continuous casting molten lead into separate elongate webs having a plurality of successive grid blanks having a substantially uniform thickness and a plurality of spaced apart and interconnected wires having interstices between them with each positive grid and negative grid having a lead weight respectively in the range of 0.5 to 2.1 and 0.3 to 0.9 grams per square inch of the area of the overall plan of the respective positive and negative grids after cold working, cold working the grid blanks of the continuous cast web for the positive grids to reduce the thickness of the cast web by not more than 2:1 and to a thickness not greater than 0.035 of an inch, and cutting positive grids from the cold worked web to provide positive grids having substantially increased corrosion resistance in use in positive plates in a lead-acid battery, and cold working the grid blanks of the continuous cast web for the negative grids to reduce the thickness of the cast web by less than 1.5:1 to 1.2:1 and to a thickness in the range of 0.022 to 0.010 of an inch, and cutting negative grids from the cold worked web.

22. A positive grid for a positive plate of a lead-acid battery comprising a grid continuous cast of molten lead as part of a web and having a substantially uniform thickness and a plurality of interconnected wires with interstices between them, the grid being cold worked to reduce the thickness of the as cast grid by not more than 2:1, a cold worked final thickness of not more than 0.035 of an inch, and the grid having a lead weight in the range of 0.5 to 2.1 grams per square inch of the area of the plan of the grid after cold working to provide a continuous cast positive grid for a positive plate of a lead-acid battery having substantially increased corrosion resistance and increased tensile strength after age hardening for 30 days.

23. The positive grid as defined in claim 22 wherein the cold worked and reduced thickness positive grid has a microstructure with a substantially smaller grain size and a more uniform grain structure than that of the as cast continuous grid of the web.

24. The positive grid as defined in claim 22 wherein the thickness of the as cast grid is reduced in the range of 2:1 to 1.5:1.

25. The positive grid as defined in claim 22 which also comprises the grid being cold worked to increase the longitudinal length of the cast grid at least 1.2:1.

26. The positive grid as defined in claim 22 wherein the cold worked positive grid has a tensile strength of at least 9,000 psi after age hardening at room temperature after being cold worked.

27. The positive grid as defined in claim 22 wherein the grid is cold worked to reduce the thickness of the grid within 24 hours of the continuous casting of the grid.

28. The positive grid as defined in claim 22 which also comprises electro-chemically active paste applied to the reduced grid to at least substantially fill the interstices with the paste.

29. The positive grid as defined in claim 22 wherein the cold worked and reduced thickness positive grid has a thickness in the range of 0.015 to 0.030 of an inch.

30. The positive grid as defined in claim 22 wherein the cold worked and reduced thickness positive grid has a thickness of not greater than about 0.032 of an inch.

31. A lead-acid battery comprising, a casing, a plurality of separate cells within said casing, each cell comprising a book of positive plates and negative plates, insulating separators disposed between adjacent plates of different polarity, an active paste applied to said plates, positive connectors joining each of said positive plates together and being connected to a positive battery terminal, and negative connectors joining each of said negative plates together and being connected to a negative battery terminal, said positive plates comprising a positive grid continuous cast of molten lead as part of a web and having a substantially uniform thickness and a plurality of interconnected wires with interstices between them and a lead weight in the range of 0.5 to 2.1 grams per square inch of the area of the overall plan of the positive grid after cold working, and the positive grid being cold worked to reduce the thickness of the grid as cast by not more than 2:1 and to a thickness of not more than 0.035 of an inch to provide a continuous cast positive grid having substantially increased corrosion resistance and increased ultimate tensile strength after full age hardening.

32. The lead-acid battery as defined in claim 31 wherein said cold worked and reduced thickness positive grid has a micro-structure with a substantially smaller grain size and a more uniform grain structure than that of the as cast continuous grid.

33. The lead-acid battery as defined in claim 31 wherein the thickness of said as cast positive grid is reduced in the range of 2:1 to 1.5:1.

34. The lead-acid battery as defined in claim 31 which also comprises said positive grid being cold worked to increase the longitudinal length of said as cast grid at least 1.2:1.

35. The lead-acid battery as defined in claim 31 wherein said cold worked positive grid has a tensile strength of at least 9,000 psi after full age hardening.

36. The lead-acid battery as defined in claim 31 wherein said positive grid is cold worked to reduce the thickness of the grid within 24 hours of the continuous casting of said grid.

37. The lead-acid battery as defined in claim 31 wherein the cold worked and reduced thickness positive grid has a thickness in the range of 0.030 to 0.015 of an inch.

38. A lead-acid battery comprising, a casing, a plurality of separate cells within said casing, each cell comprising a book of positive plates and negative plates, insulating separators disposed between adjacent plates of different polarity, an active paste applied to said plates, positive connectors joining each of said positive plates together and being connected to a positive battery terminal, and negative connectors joining each of said negative plates together and being connected to a negative battery terminal, said positive plates comprising a positive grid continuous cast of molten lead as part of a web and having a substantially uniform thickness, a plurality of interconnected wires with interstices between them, and a lead weight in the range of 0.5 to 2.1 grams per square inch of the area of the overall plan of the positive grid after cold working, and being cold worked to reduce the thickness of said as cast grid by not more than 2:1 and to a thickness in the range of 0.035 to 0.015 of an inch to provide a continuous cast positive grid having substantially increased corrosion resistance and increased tensile strength after fall age hardening, and said negative plates comprising a negative grid continuous cast of molten lead as part of a web and having a substantially uniform thickness, a plurality of interconnected wires with interstices between them, and a lead weight in the range of 0.3 to 0.9 of a gram per square inch of area of the overall plan of the negative grid after cold working, and being cold worked to reduce the thickness of said as cast negative grid in the range of about 1.2:1 to 1.5:1 and to a thickness in the range of 0.022 to 0.010 of an inch to provide a continuous cast negative grid having increased tensile strength after full age hardening.

39. The lead-acid battery as defined in claim 38 wherein the cold worked and reduced thickness positive grids each have a thickness of not greater than about 0.030 of an inch.

40. The lead-acid battery as defined in claim 38 wherein the cold worked and reduced thickness negative grids have a thickness not greater than about 0.015 of an inch.

* * * * *